US009056936B2

(12) United States Patent
Horikawa et al.

(10) Patent No.: US 9,056,936 B2
(45) Date of Patent: Jun. 16, 2015

(54) COPOLYMER OF A CONJUGATED DIENE COMPOUND AND A NON-CONJUGATED OLEFIN, RUBBER COMPOSITION, CROSSLINKED RUBBER COMPOSITION, AND TIRE

(75) Inventors: Yasuo Horikawa, Kodaira (JP); Shojiro Kaita, Oizumi-machi (JP); Olivier Tardif, Wako (JP); Junko Matsushita, Tachikawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/813,373

(22) PCT Filed: Jul. 26, 2011

(86) PCT No.: PCT/JP2011/004226
§ 371 (c)(1),
(2), (4) Date: Apr. 11, 2013

(87) PCT Pub. No.: WO2012/014456
PCT Pub. Date: Feb. 2, 2012

(65) Prior Publication Data
US 2013/0197179 A1 Aug. 1, 2013

(30) Foreign Application Priority Data

Jul. 30, 2010 (JP) ................................ 2010-173116
Feb. 4, 2011 (JP) ................................ 2011-023408

(51) Int. Cl.
*C08F 36/00* (2006.01)
*C08F 236/00* (2006.01)
*C08F 236/04* (2006.01)
*B60C 1/00* (2006.01)
*C08F 236/06* (2006.01)
*C08K 3/00* (2006.01)
*C08L 9/00* (2006.01)

(52) U.S. Cl.
CPC ............. *C08F 236/04* (2013.01); *B60C 1/00* (2013.01); *C08F 236/06* (2013.01); *C08K 3/0033* (2013.01); *C08L 9/00* (2013.01)

(58) Field of Classification Search
USPC ........................................................ 526/335
See application file for complete search history.

(56) References Cited

U.S. PATENT DOCUMENTS

| 6,288,191 B1 * | 9/2001 | Nishiyama et al. ............ 526/339 |
| 7,094,854 B2 * | 8/2006 | Monteil et al. ................. 526/339 |
| 2010/0190940 A1 | 7/2010 | Nakagawa et al. | |

FOREIGN PATENT DOCUMENTS

| CN | 101274973 A | 10/2008 | |
| EP | 1086957 A1 | 3/2001 | |
| EP | 2463313 A1 | 6/2012 | |
| JP | 09-291121 A | 11/1997 | |
| JP | 09291121 A | * 11/1997 | ............ C08F 210/08 |
| JP | 11-228743 A | 8/1999 | |
| JP | H11315119 A | 11/1999 | |
| JP | 2000-095903 A | 4/2000 | |
| JP | 2000-154210 A | 6/2000 | |
| JP | 2000-256423 A | 9/2000 | |
| JP | 2006-503141 A | 1/2006 | |
| JP | 2006-249442 A | 9/2006 | |
| JP | 2008-280384 A | 11/2008 | |
| JP | 2008280384 A | * 11/2008 | |
| WO | 2008/146643 A1 | 12/2008 | |
| WO | 2012/014455 A1 | 2/2012 | |
| WO | 2012/014463 A1 | 2/2012 | |

OTHER PUBLICATIONS

Translation of JP 2008-280384, Nov. 2008.*
Translation of JP 09-291121, Nov. 1997.*
International Search Report for PCT/JP2011/004226, dated Sep. 13, 2011.
Extended European Search Report issued Feb. 7, 2014 in European Patent Application No. 11812058.3.
First Office Action issued Feb. 28, 2014 in corresponding Chinese Patent Application No. 201180047502.4 with translation.
Communication dated Sep. 30, 2014, issued by the State Intellectual Property Office of the People's Republic of China in Chinese Application No. 201180047502.4.
Communication dated Oct. 14, 2014 from the Japanese Patent Office in counterpart Japanese Application No. 2012-526317.
Communication dated Mar. 17, 2015 from the Japanese Patent Office in corresponding Japanese Application No. 2012-526317.

* cited by examiner

*Primary Examiner* — Hui Chin
(74) *Attorney, Agent, or Firm* — Sughrue Mion, PLLC

(57) ABSTRACT

Provided is a copolymer of a conjugated diene compound and a non-conjugated olefin, the copolymer being a random copolymer including randomly arranged monomer units of the conjugated diene compound and of the non-conjugated olefin, in which the non-conjugated olefin is preferably an acyclic olefin, the non-conjugated olefin preferably has 2 to 10 carbon atoms, and specific examples of the non-conjugated olefin preferably include ethylene, propylene, and 1-butene.

11 Claims, 5 Drawing Sheets

COPOLYMER OF A CONJUGATED DIENE COMPOUND AND A NON-CONJUGATED OLEFIN, RUBBER COMPOSITION, CROSSLINKED RUBBER COMPOSITION, AND TIRE

CROSS REFERENCE TO RELATED APPLICATIONS

This application is a National Stage of International Application No. PCT/JP2011/004226, filed on Jul. 26, 2011, which claims priority from Japanese Patent Application Nos. 2010-173116, filed Jul. 30, 2010 and 2011-023408, filed Feb. 4, 2011 the contents of all of which are incorporated herein by reference in their entirety.

TECHNICAL FIELD

The present invention relates to a copolymer of a conjugated diene compound and a non-conjugated olefin, a rubber composition, a crosslinked rubber composition, and a tire, and more particularly to a copolymer of a conjugated diene compound and a non-conjugated olefin, the copolymer having randomly arranged monomer units of the conjugated olefin, which is used for manufacturing a rubber excellent in heat resistance and crack growth resistance, a rubber composition including the copolymer, a crosslinked rubber composition obtained by crosslinking the rubber composition, and a tire manufactured by using the rubber composition or the crosslinked rubber composition.

BACKGROUND ART

At least two different monomers can be polymerized in the same polymerization system so as to generate a copolymer having those different monomer units arranged as repeating units in one polymer chain, and the copolymer thus obtained can be classified into a random copolymer, an alternating copolymer, a block copolymer, or a graft copolymer, depending on the arrangement of the monomer units. However, no report has been made on the arrangement of monomer units in polymerization reaction of a conjugated diene compound and a non-conjugated olefin.

For example, JP 2000-154210 A (PTL 1) discloses a catalyst for polymerization of a conjugated diene, the catalyst including a group IV transition metal compound which has a cyclopentadiene ring structure, in which an α-olefin such as ethylene is exemplified as a monomer copolymerizable with the conjugated diene. However, no reference is made on the arrangement of monomer units in the copolymer. Further, JP 2006-249442 A (PTL 2) discloses a copolymer of an α-olefin and a conjugated diene compound, but no reference is made on the arrangement of monomer units in the copolymer. Further, JP 2006-503141 A (PTL 3) discloses an ethylene-butadiene copolymer synthesized by using a catalytic system consisting of a specific organometallic complex, but merely describes that the butadiene as a monomer is inserted in the form of trans-1,2-cyclohexane into the copolymer, without making any reference to the arrangement of monomer units in the copolymer, and no reference is made to a rubber manufactured by using a random copolymer having randomly arranged monomer units of a conjugated diene compound and of a non-conjugated olefin, so as to obtain an excellent heat resistance and crack growth resistance.

In addition, JP 11-228743 A (PTL 4) discloses an unsaturated elastomer composition composed of an unsaturated olefin-based copolymer as a random copolymer and a rubber. However, the copolymer includes a plurality of structures having not only 1,4 bonds and 1,2 bonds (including 3,4 bonds) but also three members and five members, and thus the arrangements thereof are unclear.

Further, although PTL 4 actually exemplifies a ternary copolymer, no description is given of an example of a binary copolymer such as an ethylene-butadiene copolymer.

In addition, no reference is made to the crack growth resistance of an unsaturated elastomer composition including the random copolymer, and therefore it is unclear about the property.

That is, JP 11-228743 A (PTL 4) does not describe a rubber manufactured by using a random copolymer having randomly arranged monomer units of a conjugated diene compound and of a non-conjugated olefin, so as to obtain an excellent heat resistance and crack growth resistance.

CITATION LIST

Patent Literature

PTL 1: JP 2000-154210 A
PTL 2: JP 2006-249442 A
PTL 3: JP 2006-503141 A
PTL 4: JP 11-228743 A

SUMMARY OF INVENTION

Technical Problem

In view of the above, an object of the present invention is to provide: a copolymer of a conjugated diene compound and a non-conjugated olefin, which is used for manufacturing a rubber excellent in heat resistance and crack growth resistance, the copolymer having no block sequence including monomer units of the non-conjugated olefin while having randomly arranged monomer units of the non-conjugated olefin; a rubber composition including the copolymer; a crosslinked rubber composition obtained by crosslinking the rubber composition; and a tire manufactured by using the rubber composition or the crosslinked rubber composition.

Solution to Problem

As a result of keen study for solving the aforementioned problems, the inventors of the present invention have found the following, and achieved the present invention. That is, a copolymer of a conjugated diene compound and a non-compound olefin that includes hardly any cyclic structure and includes a random structure without having no crystallization temperature, which is to be derived from a block sequence including monomer units of the non-conjugated olefin, observed in differential scanning calorimetry, can be obtained by polymerizing a conjugated diene compound and a non-conjugated olefin in the presence of a specific catalyst, or by introducing, into a polymerization system for polymerizing a conjugated diene compound and a non-conjugated olefin, a conjugated diene compound in the presence of a non-conjugated olefin.

That is, a copolymer of a conjugated diene compound and a non-conjugated olefin according to the present invention is a random copolymer having randomly arranged monomer units of the conjugated diene compound and of the non-conjugated olefin.

In the copolymer of a conjugated diene compound and a non-conjugated olefin according to the present invention, a cis-1,4 bond content in the conjugated diene compound unit (unit derived from the conjugated diene compound) is preferably at least 25%, which is more preferably more than 50%.

In another preferred example of the copolymer of a conjugated diene compound and a non-conjugated olefin of the present invention, the non-conjugated olefin (unit derived from the non-conjugated olefin) is contained over 0 mol % to 50 mol % or less. Here, the non-conjugated olefin (unit derived from the non-conjugated olefin) is preferably contained over 0 mol % to 20 mol % or less.

In another preferred example of the copolymer of a conjugated diene compound and a non-conjugated olefin according to the present invention, the content of 1,2 adducts (including 3,4 adducts) in the conjugated diene compound units (the content of 1,2 adduct units (including 3,4 adduct units) of the conjugated diene compound in a unit derived from the conjugated diene compound) is preferably 5% or less.

The copolymer of a conjugated diene compound and a non-conjugated olefin according to the present invention preferably has a polystyrene-equivalent average-weight molecular weight of 10,000 to 10,000,000.

The copolymer of a conjugated diene compound and a non-conjugated olefin according to the present invention preferably has a molecular weight distribution (Mw/Mn) of 10 or less.

In a preferred example of the copolymer of a conjugated diene compound and a non-conjugated olefin according to the present invention, the non-conjugated olefin is an acyclic olefin.

In another preferred example of the copolymer of a conjugated diene compound and a non-conjugated olefin of the present invention, the non-conjugated olefin has 2 to 10 carbon atoms.

In the copolymer of a conjugated diene compound and a non-conjugated olefin according to the present invention, the non-conjugated olefin is preferably at least one selected from a group consisting of ethylene, propylene, and 1-butene, and the non-conjugated olefin is more preferably ethylene.

In another preferred example of the copolymer of a conjugated diene compound and a non-conjugated olefin according to the present invention, the conjugated diene compound is at least one selected from a group consisting of 1,3-butadiene and isoprene.

A rubber composition according to the present invention includes the copolymer of a conjugated diene compound and a non-conjugated olefin of the present invention.

The rubber composition according to the present invention preferably includes, with respect to 100 parts by mass of the rubber component, a reinforcing filler by 5 parts by mass to 200 parts by mass, and a crosslinking agent by 0.1 parts by mass to 20 parts by mass.

A crosslinked rubber composition according to the present invention is obtained by crosslinking the rubber composition of the present invention.

A tire according to the present invention is manufactured by using the rubber composition of the present invention or the crosslinked rubber composition of the present invention.

Advantageous Effect of Invention

The present invention is capable of providing: a copolymer of a conjugated diene compound and a non-conjugated olefin, which is used for manufacturing a rubber excellent in heat resistance and crack growth resistance, the copolymer having no block sequence including monomer units of the non-conjugated olefin while having randomly arranged monomer units of the non-conjugated olefin; a rubber composition including the copolymer; a crosslinked rubber composition obtained by crosslinking the rubber composition; and a tire manufactured by using these rubber compositions.

BRIEF DESCRIPTION OF DRAWINGS

The present invention will be further described below with reference to the accompanying drawings, wherein.

DESCRIPTION OF EMBODIMENTS (Copolymer)

Figure 1:
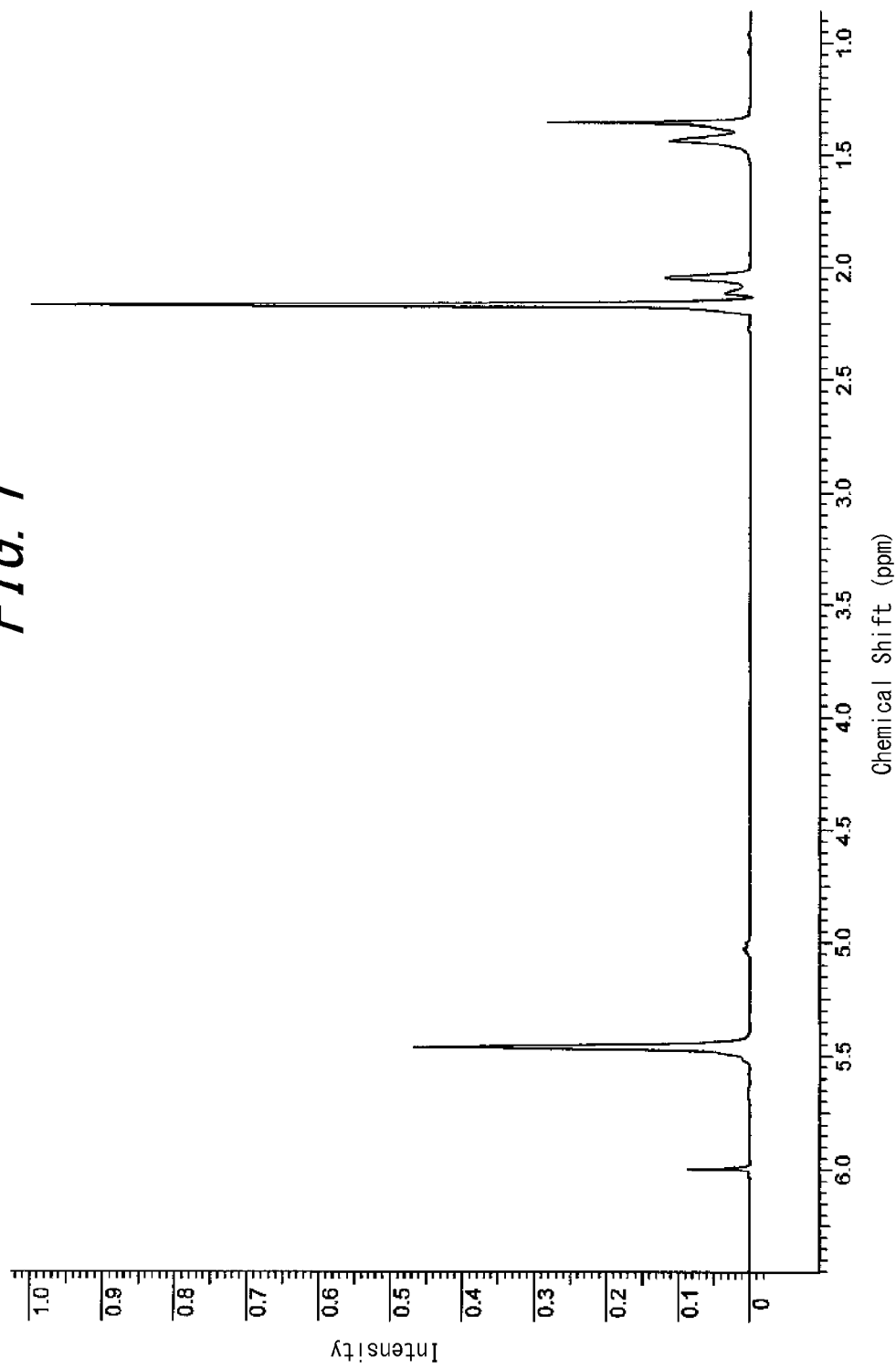
FIG. 1 is a $^1$H-NMR spectrum chart of a copolymer A.

The present invention will be described in detail hereinafter. The present invention provides a copolymer of a conjugated diene compound and a non-conjugated olefin copolymer, which is a random copolymer having randomly arranged monomer units of the conjugated diene compound and the non-conjugated olefin, in which the crystallization temperature derived from a block sequence including monomer units of the non-conjugated diene compound cannot be observed when the copolymer is subjected to differential scanning calorimetry. That is, the copolymer of the present invention is free of a block sequence including monomer units of the non-conjugated olefin while having randomly arranged monomer units of the non-conjugated olefin, and thus has a random sequence (also referred to as random structure) having randomly arranged monomer units of the conjugated diene compound and of the non-conjugated olefin. The randomly arranged monomer units of the non-conjugated olefin as described above allow the non-conjugated olefin with heat resistance property or the like to be introduced into the main chain of the copolymer without causing macrophase separation of the copolymer. Here, the differential scanning calorimetry (DSC) is a measuring method according to JIS K 7121-1987. In the copolymer of the present invention, the crystallization temperature derived from a block sequence including monomer units of the non-conjugated diene compound cannot be observed when the copolymer is subjected to differential scanning calorimetry, and thus the copolymer may be referred to as copolymer with no crystalline structure. The block sequence includes a multiblock sequence. A block copolymer including a plurality of structures of (X-Y) or of (Y-X) is referred to as multiblock sequence (in which: X denotes a block sequence including monomer units of a non-conjugated olefin; and Y denotes a block sequence including monomer units of a conjugated diene compound).

The copolymer of a conjugated diene compound and a non-conjugated olefin according to the present invention is free of a problem of molecular weight reduction, and the weight-average molecular weight (Mw) thereof is not specifically limited. However, in view of the application to polymer materials, a polystyrene-equivalent weight-average molecular weight (Mw) of the copolymer is preferably 10,000 to 10,000,000, more preferably 10,000 to 1,000,000, and further preferably 50,000 to 600,000. Further, the molecular weight distribution (Mw/Mn) obtained as a ratio of the weight-average molecular weight (Mw) to the number average molecular weight (Mn) is preferably 10 or less, and more preferably 5 or less. Here, the average molecular weight and the molecular weight distribution can be determined by gel permeation chromatography (GPC) using polystyrene as a standard reference material.

According to the copolymer of a conjugated diene compound and a non-conjugated olefin of the present invention, the cis-1,4 bond content in the conjugated diene compound unit (unit derived from the conjugated diene compound) is preferably at least 25%, and more preferably over 50%. The cis-1,4 bond content in the conjugated diene compound unit (unit derived from the conjugated diene compound) is further preferably at least 75%, and still further preferably at least 90%. The cis-1,4 bond content in the conjugated diene compound unit (unit derived from the conjugated diene compound) of 25% or more allows the glass transition temperature (Tg) to be maintained low, which improves physical property such as crack growth resistance and wear resistance. Here, the cis chains of the conjugated diene may be distributed either continuously or discontinuously in the component ratio in a range defined by the present invention.

The cis-1,4 bond content corresponds to an amount in a unit derived from the conjugated diene compound, rather than the ratio to the entire copolymer.

According to the copolymer of a conjugated diene compound and a non-conjugated olefin of the present invention, the content of the non-conjugated olefin (unit derived from the non-conjugated olefin) is preferably over 0 mol % to 50 mol % or less, and further preferably over 0 mol % to 20 mol % or less. The content of the non-conjugated olefin (unit derived from the non-conjugated olefin) falling within the ranges specified above is capable of effectively improving heat resistance, without causing macrophase separation of the copolymer.

On the other hand, according to the copolymer of a conjugated diene compound and a non-conjugated olefin of the present invention, the content of the conjugated diene compound (unit derived from the conjugated diene compound) is preferably 50 mol % or more to less than 100 mol %, and further preferably 80 mol % or more to less than 100 mol %. The content of the conjugated diene compound (unit derived from the conjugated diene compound) falling within the ranges specified above is capable of allowing the copolymer of the present invention to uniformly behave as an elastomer.

The conjugated diene compound to be used as a monomer preferably has 4 to 12 carbon atoms. Specific examples of such conjugated diene compounds include: 1,3-butadiene; isoprene; 1,3-pentadiene; and 2,3-dimethyl butadiene, with 1,3-butadiene and isoprene being preferred. These conjugated diene compounds may be used alone or in combination of two or more.

Any of the aforementioned specific examples of conjugated diene compounds can be used for preparing the copolymer of the present invention in the same mechanism.

On the other hand, a non-conjugated olefin to be used as a monomer, which is a non-conjugated olefin other than the conjugated diene compound, has an excellent heat resistance, and is capable of reducing the ratio of double covalent bonds in the main chain of the copolymer so as to reduce crystallinity thereof, to thereby increase design freedom as an elastomer. Further, the non-conjugated olefin is preferably an acyclic olefin, and the non-conjugated olefin preferably has 2 to 10 carbon atoms. Therefore, preferred examples of the aforementioned non-conjugated olefin include α-olefins such as: ethylene; propylene; 1-butene; 1-pentene; 1-hexene; 1-heptene; and 1-octene. Of those, ethylene, propylene, 1-butene are more preferred, and ethylene is further preferred. These non-conjugated olefins may be used alone or in combination of two or more. Here, olefin refers to unsaturated aliphatic hydrocarbon, which is a compound containing at least one carbon-carbon double covalent bond.

According to the copolymer of a conjugated diene compound and a non-conjugated olefin of the present invention, the content of 1,2 adducts (including 3,4 adducts) in the conjugated diene compound unit (the content of 1,2 adduct units (including 3,4 adduct units) of the conjugated diene compound in a unit derived from the conjugated diene compound) is preferably 5% or less (vinyl bond content is 5 mol % or less), more preferably 3% or less, and further preferably 2.5% or less.

When the content of 1,2 adducts (including 3,4 adducts) in the conjugated diene compound unit (the content of 1,2 adduct units (including 3,4 adduct units) of a conjugated diene compound in a unit derived from the conjugated diene compound) is 5% or less, the copolymer of the present invention can further be improved in crack growth resistance and ozone resistance. Further, when the content of 1,2 adducts (including 3,4 adducts) in the conjugated diene compound unit is 2.5% or less, the copolymer of the present invention can further be improved in ozone resistance and fatigue resistance.

The content of 1,2 adduct units (including 3,4 adduct units) corresponds to an amount contained in a unit derived from the conjugated diene compound, rather than the ratio to the entire copolymer.

Here, the content of 1,2 adduct units (including 3,4 adduct units) in the conjugated diene compound unit (the content of 1,2 adduct units (including 3,4 adduct units) of a conjugated diene compound in a unit derived from the conjugated diene compound) is equal to a 1,2-vinyl bond content when the conjugated diene compound is butadiene.

Next, a method of manufacturing the copolymer according to the present invention will be described in detail. However, the manufacturing method described in detail below is merely an example.

A first method of manufacturing a copolymer of a conjugated diene compound and a non-conjugated olefin according to the present invention includes polymerizing a conjugated diene compound and a non-conjugated olefin, in the presence of a metallocene-based composite catalyst represented by the following formula (A):

$$R_a MX_b QY_b \quad \quad (A)$$

(where R each independently represents an unsubstituted or substituted indenyl group, the R being coordinated with M; M represents a lanthanoid element, scandium, or yttrium; X each independently represents a hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2), preferably, a metallocene-based composite catalyst represented by the following general formula (I):

[Formula 1]

(where $M^1$ represents a lanthanoid element, scandium, or yttrium; $Cp^R$ each independently represents an unsubstituted or substituted indenyl group; $R^A$ to $R^B$ each independently represent a hydrocarbon group having 1 to 20 carbon atoms, the $R^A$ and $R^B$ being μ-coordinated with $M^1$ and Al; and $R^C$ and $R^D$ each independently represent a hydrocarbon group having 1 to 20 carbon atoms or a hydrogen atom), or a polymerization catalyst composition containing the metallocene-based composite catalyst and boron anion.

In the first method of manufacturing the copolymer of a conjugated diene compound and a non-conjugated olefin according to the present invention, the polymerization can be carried out similarly to a general method of manufacturing a copolymer using a coordination ion polymerization catalyst, except in that the aforementioned metallocene-based composite catalyst or the aforementioned polymerization catalyst composition is used. Further, the copolymer of a conjugated diene compound and a non-conjugated olefin thus obtained has a random sequence having a completely random arrangement of monomer units of the non-conjugated olefin. Here, there may be employed an arbitrary polymerization method including, for example, solution polymerization, suspension polymerization, liquid phase bulk polymerization, emulsion polymerization, vapor phase polymerization, and solid state polymerization. Further, in the case of using a solvent for polymerization, any solvent that is inactive in polymerization can be used, and examples thereof include toluene, hexane, cyclohexane, and a mixture thereof.

The metallocene-based composite catalyst is a compound having: a rare earth element such as lanthanoid element, scandium, or yttrium and a Group 13 element in the periodic table, and preferably represented by the formula (A) or the formula (I). Here, the μ-coordination refers to a mode of coordination which forms a crosslinked structure.

In the metallocene-based composite catalyst, the metal represented by M in the formula (A) is a lanthanoid element, scandium, or yttrium. The lanthanoid elements include 15 elements with atomic numbers 57 to 71, and may be any one of them. Preferred examples of the metal represented by M include samarium (Sm), neodymium (Nd), praseodymium (Pr), gadolinium (Gd), cerium (Ce), holmium (Ho), scandium (Sc), and yttrium (Y).

In the formula (A), R each independently represents an unsubstituted or substituted indenyl, the R being coordinated with the metal M. Specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include: boron, aluminum, gallium, indium, and thallium.

In the formula (A), X each independently represents a hydrocarbon group having 1 to 20 carbon atoms, the X being μ-coordinated with M and Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (A), Y each independently represents a hydrocarbon group having 1 to 20 carbon atoms or a hydrogen atom, the Y being coordinated with Q. Here, examples of the hydrocarbon group having 1 to 20 carbon atoms include, a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

On the other hand, in the metallocene-based composite catalyst, the metal represented by $M^1$ in the formula (I) is a lanthanoid element, scandium, or yttrium. The lanthanoid elements include 15 elements with atomic numbers 57 to 71, and may be any one of them. Preferred examples of the metal represented by $M^1$ include samarium (Sm), neodymium (Nd), praseodymium (Pr), gadolinium (Gd), cerium (Ce), holmium (Ho), scandium (Sc), and yttrium (Y).

In the formula (I), $Cp^R$ represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11, respectively. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Specific examples of the hydrocarbyl group suitably include a methyl group, an ethyl group, a phenyl group, and a benzyl group. Meanwhile, examples of metalloid in the metalloid group include germyl (Ge), stannyl (Sn), and silyl (Si). In addition, the metalloid group preferably has a hydrocarbyl group, which is similar to the hydrocarbyl group described above. Specific example of the metalloid group is a trimethylsilyl group. Specific examples of the substituted indenyl group include 2-phenyl indenyl and 2-methyl indenyl group. Two $Cp^R$ in the formula (I) may be the same as or different from each other.

In the formula (I), $R^A$ and $R^B$ each independently represent a hydrocarbon group having 1 to 20 carbon atoms, the $R^A$ and $R^B$ being μ-coordinated with $M^1$ and Al. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (I), $R^C$ and $R^D$ each independently represent a hydrocarbon group having 1 to 20 carbon atoms or a hydrogen atom. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The metallocene-based composite catalyst can be obtained by, for example, reacting with an organic aluminum compound represented by $AlR^K R^L R^M$ in a solvent, the metallocene complex represented by the following formula (II):

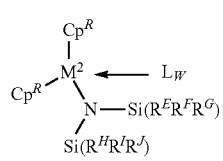

(where $M^2$ represents a lanthanoid element, scandium, or yttrium; $Cp^R$ each independently represents an unsubstituted or substituted indenyl group; $R^E$ to $R^J$ each independently represent a hydrogen atom or an alkyl group having 1 to 3 carbon atoms, L represents a Lewis base, and w represents an integer of 0 to 3). The reaction may be carried out at temperatures around room temperature, and thus the metallocene-based composite catalyst can be manufactured under mild conditions. The reaction time is arbitrary, and may be about several hours to several tens of hours. The reaction solvent is not particularly limited, and any solvent including, for example, toluene and hexane, which are capable of dissolving the raw material and the product can be preferably used. The structure of the metallocene-based composite catalyst may preferably be determined by $^1$H-NMR.

In the metallocene complex represented by the formula (II), $Cp^R$ is an unsubstituted indenyl or substituted indenyl, and is equivalent to $Cp^R$ in the formula (I). Further, in the formula (II), the metal $M^2$ represents a lanthanoid element, scandium, or yttrium, which is equivalent to the metal $M^1$ in the formula (I).

The metallocene complex represented by the formula (II) includes a silyl amide ligand represented by [—N(SiR$_3$)$_2$]. Groups represented by R ($R^E$ to $R^J$) in the silyl amide ligand each independently represent a hydrogen atom or an alkyl group having 1 to 3 carbon atoms, and it is preferred that at least one of $R^E$ to $R^J$ represents a hydrogen atom. With at least one of $R^E$ to $R^J$ representing a hydrogen atom, the catalyst can be synthesized with ease. Further, a methyl group is preferred as the alkyl group.

The metallocene complex represented by the formula (II) further includes 0 or 3, preferably 0 to 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same as or different from each other.

The metallocene complex represented by the general formula (II) may be present as a monomer or as a dimer or a multimer having two or more monomers.

On the other hand, an organic aluminum compound to be used for generating the metallocene-based composite catalyst is represented by a general formula $AlR^KR^LR^M$, where $R^K$ and $R^L$ each independently represent a univalent hydrocarbon group having 1 to 20 carbon atoms or a hydrogen atom and $R^M$ represents a univalent hydrocarbon group having 1 to 20 carbon atoms, with the $R^M$ being either the same as or different from $R^K$ or $R^L$. Examples of the univalent hydrocarbon groups having 1 to 20 carbon atoms include a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

Specific examples of the organic aluminum compound include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. These organic aluminum compounds may be contained alone or in combination of two or more. The content of the organic aluminum compound to be used for generating the metallocene-based composite catalyst is preferably 2-fold mol to 50-fold mol, and more preferably about 3-fold mol to 5-fold mol, with respect to the metallocene complex.

Further, the polymerization catalyst composition includes the metallocene-based composite catalyst and boron anion (hereinafter, the polymerization catalyst composition is also referred to as first polymerization catalyst composition). The first polymerization catalyst composition preferably further includes another component such as a co-catalyst, which is contained in a general polymerization catalyst composition containing a metallocene complex. Here, the first polymerization catalyst composition is also referred to as two-component catalyst, which has the metallocene-based composite catalyst and boron anion. The first polymerization catalyst composition is capable of producing, similarly to the metallocene-based composite catalyst, a copolymer of a conjugated diene compound and a non-conjugated olefin having a random sequence including a completely random arrangement of monomer units of the non-conjugated olefin. In addition, the first polymerization catalyst composition further contains boron anion, which allows the content of each monomer component in the copolymer to be arbitrarily controlled.

In the first polymerization catalyst composition, a specific example of the boron anion forming the two-component catalyst includes a tetravalent boron anion. Examples thereof may include: a tetraphenyl borate, a tetrakis(monofluorophenyl) borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (tripheyl, pentafluorophenyl)borate, a [tris(pentafluorophenyl), phenyl]borate, and a tridecahydride-7,8-dicarbaundecaborate, with the tetrakis(pentafluorophenyl) borate being preferred.

The boron anion may be used as an ionic compound combined with cation. Examples of the cation include a carbonium cation, an oxonium cation, an ammonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and more specifically, an example of the tri(substituted phenyl)carbonium cation includes a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl) phosphonium cation, and a tri(dimethylphenyl)phosphonium cation. Of those cations, the N,N-dialkylanilinium cations or the carbonium cations are preferred, and the N,N-dialkylanilinium cations are particularly preferred. Therefore, preferred examples of the ionic compound include a N,N-dimethylanilinium tetrakis(pentafluorophenyl)borate and a triphenylcarbonium tetrakis(pentafluorophenyl)borate. The content of the ionic compound including a boron anion and a cation may preferably be added by 0.1-fold mol to 10-fold mol, and more preferably by about 1-fold mol, with respect to the metallocene-based composite catalyst.

Preferred examples of the co-catalyst that can be contained in the first polymerization catalyst composition may include an organic aluminum compound represented by the $AlR^KR^LR^M$, and also preferably include aluminoxanes. The aluminoxane is preferably an alkyl aluminoxane. Examples of the alkyl aluminoxane include as methylaluminoxane (MAO) and modified methylaluminoxanes. Preferred examples of the modified methylaluminoxane include MMAO-3A (manufactured by Tosoh Finechem Corporation). These aluminoxanes may be contained alone or in combination of two or more.

In the first method of manufacturing the copolymer of a conjugated diene compound and a non-conjugated olefin according to the present invention, the polymerization can be carried out similarly to a general method of manufacturing a copolymer using a coordination ion polymerization catalyst, except in that the metallocene-based composite catalyst or the first polymerization catalyst composition is used as described above. Here, in the case of carrying out the method of manufacturing the copolymer of the present invention using the first polymerization catalyst composition, the method can be performed in either one of the following manners. That is, for example, (1) the two components forming the two-component catalyst may be separately provided in the polymerization reaction system including, as monomers, a conjugated diene compound and a conjugated olefin, to thereby prepare the first polymerization catalyst composition in the polymerization reaction system, or (2) the first polymerization catalyst composition prepared in advance may be provided into the polymerization reaction system. The amount of the metallocene-based composite catalyst to be contained in the polymerization catalyst composition is preferably set to fall within a range of 0.0001-fold mol to 0.01-fold mol with respect to the total amount of the conjugate diene compound and the non-conjugated olefin.

Further, in the first method of manufacturing the copolymer of a conjugated diene compound and a non-conjugated olefin according to the present invention, a terminator such as ethanol and isopropanol may be used to stop the polymerization.

Further, according to the first method of manufacturing the copolymer of a conjugated diene compound and a non-conjugated olefin of the present invention, the polymerization reaction of the conjugated diene compound and the non-conjugated olefin may preferably be performed in an inert gas atmosphere, and preferably in an nitrogen or argon atmosphere. The polymerization temperature of the polymerization reaction is not particularly limited, and preferably in a range of, for example, −100° C. to 200° C., and may also be set to temperatures around room temperature. An increase in polymerization temperature may reduce the cis-1,4-selectivity in the polymerization reaction. The polymerization reaction is preferably performed under pressure in a range of 0.1 MPa to 10 MPa so as to allow a conjugated diene compound and a non-conjugated olefin to be sufficiently introduced into the polymerization system. Further, the reaction time of the polymerization reaction is not particularly limited, and may preferably be in a range of, for example, 1 second to 10 days, which may be selected as appropriate depending on the conditions such as the type of the monomers to be polymerized, the type of the catalyst, and the polymerization temperature.

Further, according to the first method of manufacturing the copolymer of a conjugated diene compound and a non-conjugated olefin of the present invention, in polymerizing a conjugated diene compound and a non-conjugated olefin, the concentration of the conjugated diene compound (mol/L) and the concentration of the non-conjugated olefin (mol/L) at the start of copolymerization preferably satisfy the following relation:

the concentration of the non-conjugated olefin/the concentration of the conjugated diene compound ≥1.0;
further preferably satisfy the following relation:
the concentration of the non-conjugated olefin/the concentration of the conjugated diene compound ≥1.3; and
still further preferably satisfy the following relation:
the concentration of the non-conjugated olefin/the concentration of the conjugated diene compound ≥1.7.

The ratio of the concentration of the non-conjugated olefin to the concentration of the conjugated diene compound is defined to be at least 1, to thereby efficiently introduce the non-conjugated olefin into the reaction mixture.

The copolymer of a conjugated diene compound and a non-conjugated olefin of the present invention can be manufactured by controlling the introduction of monomers to a polymerization system, even without using the metallocene-based composite catalyst or the polymerization catalyst composition. Specifically, a second method of manufacturing the copolymer according to the present invention has a feature in that the introduction of a conjugated diene compound is controlled in the presence of a non-conjugated olefin so as to control the chain structure of the copolymer, to thereby control the arrangement of monomer units in the copolymer. According to the present invention, the term "polymerization system" herein refers to a location where a conjugated diene compound and a non-conjugated olefin are copolymerized, and a specific example thereof includes a reaction container or the like.

Here, the introduction of a conjugated diene compound may either be continuous introduction or divisional introduction. Further, the continuous introduction and the divisional introduction may be employed in combination. The continuous introduction herein refers to, for example, adding a conjugated diene compound at a certain addition rate for a certain period.

Specifically, introducing a conjugated diene compound into a polymerization system for copolymerizing the conjugated diene compound and a non-conjugated olefin allows control of the concentration ratio of monomers in the polymerization system, with the result that the chain structure (that is, the arrangement of monomer units) in the copolymer to be obtained can be defined. Further, a conjugated diene compound is introduced in the presence of a non-conjugated olefin in the polymerization system, to thereby suppress generation of homopolymer of a conjugated diene compound. The polymerization of a non-conjugated olefin may be started prior to the introduction of a conjugated diene compound.

For example, in manufacturing a random copolymer by the second manufacturing method, the following methods are effective. That is, a method of newly introducing, to a polymerization system in which the polymerization of a non-conjugated olefin has been started in advance, a conjugated diene compound at least once in the presence of a non-conjugated olefin, or a method of introducing, in the presence of a non-conjugated olefin, a conjugated diene compound into the polymerization system for polymerizing a conjugated diene compound and a non-conjugated olefin.

The aforementioned second manufacturing method is not specifically limited as long as the introduction of monomers into a polymerization system is specified as described above, and there may be employed an arbitrary polymerization method including, for example, solution polymerization, suspension polymerization, liquid phase bulk polymerization, emulsion polymerization, vapor phase polymerization, and solid state polymerization. Further, the aforementioned second manufacturing method can be performed, similarly to the first manufacturing method, to polymerize a conjugated diene compound and a non-conjugated olefin as monomers, except in that the introduction of monomers into the polymerization system is specified as described above.

In the aforementioned second manufacturing method, the introduction of a conjugated diene compound needs to be controlled. Specifically, it is preferred to control the amount of a conjugated diene compound to be introduced and the number of times to introduce the conjugated diene compound. Examples of a method of controlling the introduction of a conjugated diene compound may include, but not limited to: a controlling method based on a computer program or the like; and an analog control method with the use of a timer or the like. Further, as described above, the method of introducing a conjugated diene compound is not specifically limited, and may be exemplified by continuous introduction or divisional introduction. Here, in divisionally introducing a conjugated diene compound, the number of times to introduce the conjugated diene is not specifically limited.

Further, the aforementioned second manufacturing method requires the presence of a non-conjugated olefin upon introduction of a conjugated diene compound, and thus it is preferred to continuously feed a non-conjugated olefin to the polymerization system. Here, how to feed the non-conjugated olefin is not specifically limited.

According to the second method of manufacturing the copolymer of the present invention, it is preferred to polymerize a conjugated diene compound and a non-conjugated olefin in the presence of the following polymerization catalyst or polymerization catalyst composition, in view of efficiently enhancing the polymerization. Further, in the case of using a solvent for polymerization, any solvent that is inactive in polymerization can be used, and an example thereof includes toluene.

An example of the aforementioned polymerization catalyst composition preferably include a polymerization catalyst composition (hereinafter, also referred to as second polymerization catalyst composition) including at least one complex selected from a group consisting of: a metallocene complex represented by the following general formula (III); a metallocene complex represented by the following general formula (IV); and a half metallocene cation complex represented by the following general formula (V):

[Formula 3]

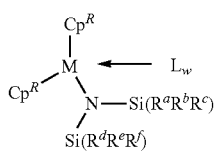

(III)

(In the formula (III), M represents a lanthanoid element, scandium, or yttrium; $Cp^R$ each independently represents an unsubstituted or substituted indenyl group; $R^a$ to $R^f$ each independently represent a hydrogen atom or an alkyl group having 1 to 3 carbon atoms; L represents a neutral Lewis base; and w represents an integer of 0 to 3.);

[Formula 4]

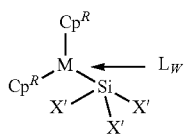

(IV)

(In the formula (IV), M represents a lanthanoid element, scandium, or yttrium; $Cp^R$ each independently represents an unsubstituted or substituted indenyl group; X' represents a hydrogen atom, a halogen atom, an alkoxy group, a thiolate group, an amide group, a silyl group, or a hydrocarbon group having 1 to 20 carbon atoms; L represents a neutral Lewis base; and w represents an integer of 0 to 3.); and

[Formula 5]

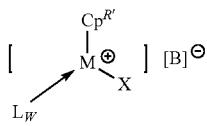

(V)

(In the formula (V), M represents a lanthanoid element, scandium, or yttrium; $Cp^{R'}$ each independently represents an unsubstituted or substituted cyclopentadienyl, indenyl, fluorenyl group; X represents a hydrogen atom, a halogen atom, an alkoxy group, a thiolate group, an amide group, a silyl group, or a hydrocarbon group having 1 to 20 carbon atoms; L represents a neutral Lewis base; w represents an integer of 0 to 3; and $[B]^-$ represents a non-coordinating anion.). The second polymerization catalyst composition may further include another component such as a co-catalyst, which is contained in a general polymerization catalyst composition containing a metallocene complex.

Here, the metallocene complex is a complex compound having at least one more cyclopentadienyl groups or derivative of cyclopentadienyl groups bonded to the central metal. In particular, a metallocene complex may be referred to as half metallocene complex when the number of cyclopentadienyl group or derivative thereof bonded to the central metal is one. In the polymerization system, the concentration of the complex contained in the second polymerization catalyst composition is preferably defined to fall within a range of 0.1 mol/L to 0.0001 mol/L.

In the metallocene complex represented by the general formulae (III) and (IV) above, $Cp^R$ in the formulae represents an unsubstituted or substituted indenyl group. $Cp^R$ having an indenyl ring as a basic skeleton may be represented by $C_9H_{7-x}R_x$ or $C_9H_{11-x}R_x$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group is a trimethylsilyl group. Specific examples of the substituted indenyl group include 2-phenyl indenyl, 2-methyl indenyl, and 1-methyl-2-phenyl indenyl group. Two $Cp^R$ in the general formulae (III) and (IV) may be the same as or different from each other.

In the half metallocene cation complex represented by the general formula (V), $Cp^{R'}$ in the formula represents a substituted or unsubstituted cyclopentadienyl, indenyl, or fluorenyl group, with the substituted or unsubstituted indenyl group being preferred. $Cp^{R'}$ having a cyclopentadienyl ring as a basic skeleton is represented by $C_5H_{5-x}R_x$. Here, X represents an integer of 0 to 5. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a propyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. $Cp^{R'}$ having a cyclopentadienyl ring as a basic skeleton is specifically exemplified as follows.

[Formula 6]

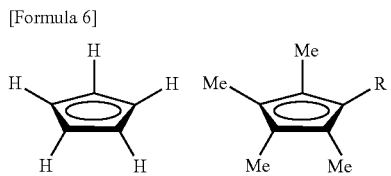

(In the formula, R represents a hydrogen atom, a methyl group, or an ethyl group.)

In the general formula (V), $Cp^{R'}$ having an indenyl ring as a basic skeleton is defined as the same as $Cp^R$ in the general formula (III), and preferred examples thereof are also the same as those of $Cp^R$ in the general formula (I).

In the general formula (V), $Cp^{R'}$ having the fluorenyl ring above as a basic skeleton may be represented by $C_{13}H_9$—$_xR_x$ or $C_{13}H_{17}$—$_xR_x$. Here, X represents an integer of 0 to 9 or 0 to 17. R independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (III), (IV), and (V) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (III) includes a silyl amide ligand represented by [—N(SiR$_3$)$_2$]. Groups represented by R(R$^a$ to R$^f$ in the general formula (I)) in the silyl amide ligand each independently represent a hydrogen atom or an alkyl group having 1 to 3 carbon atoms, and it is preferred that at least one of R$^a$ to R$^f$ represents a hydrogen atom. With at least one of R$^a$ to R$^f$ representing a hydrogen atom, the catalyst can be synthesized with ease, and the height around silicon can be reduced, to thereby allow the non-conjugated olefin to be easily introduced. Based on the same objective, it is further preferred that at least one of R$^a$ to R$^c$ represents a hydrogen atom, and at least one of R$^d$ to R$^f$ represents a hydrogen atom. A methyl group is preferred as the alkyl group.

The metallocene complex represented by the general formula (IV) includes a silyl ligand represented by [—SiX'$_3$]. X' in the silyl ligand represented by [—SiX'$_3$] is a group defined as the same as X in the general formula (V) described below, and preferred examples thereof are also the same as those of X in the general formula (V).

In the general formula (V), X represents a group selected from a group consisting of a hydrogen atom, a halogen atom, an alkoxy group, a thiolate group, an amide group, a silyl group, and a hydrocarbon group having 1 to 20 carbon atoms. In the general formula (V), the alkoxy group represented by X may be any one of aliphatic alkoxy groups such as a methoxy group, an ethoxy group, a propoxy group, an n-butoxy group, an isobutoxy group, a sec-butoxy group, and a tert-butoxy group; and aryl oxide groups (aromatic alkoxy groups) such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group, with the 2,6-di-tert-butylphenoxy group being preferred.

In the general formula (V), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group, with the 2,4,6-triisopropylthiophenoxy group being preferred.

In the general formula (V), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bistrialkylsilyl amide groups such as a bistrimethylsilyl amide group, with the bistrimethylsilyl amide group being preferred.

In the general formula (V), the silyl group represented by X may be any one of a trimethylsilyl group, a tris(trimethylsilyl) silyl group, a bis(trimethylsilyl)methylsilyl group, a trimethylsilyl(dimethyl)silyl group, and a triisopropylsilyl(bistrimethylsilyl)silyl group, with the tris(trimethylsilyl)silyl group being preferred.

In the general formula (V), the halogen atom represented by X may be any one of a fluorine atom, a chlorine atom, a bromine atom, and an iodine atom, with the chlorine atom and the iodine atom being preferred. Specific examples of the hydrocarbon group having 1 to 20 carbon atoms include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bistrimethylsilylmethyl group each containing a silicon atom, with the methyl group, the ethyl group, the isobutyl group, the trimethylsilylmethyl group, and the like being preferred.

In the general formula (V), the bistrimethylsilyl amide group and the hydrocarbon group having 1 to 20 carbon atoms are preferred as X.

In the general formula V), examples of the non-coordinating anion represented by [B]⁻ include tetravalent boron anions. Examples of the tetravalent boron anion include tetraphenyl borate, tetrakis(monofluorophenyl)borate, tetrakis (difluorophenyl)borate, tetrakis(trifluorophenyl)borate, tetrakis(tetrafluorophenyl)borate, tetrakis(pentafluorophenyl) borate, tetrakis(tetrafluoromethylphenyl)borate, tetra(tolyl) borate, tetra(xylyl)borate, (tripheyl, pentafluorophenyl) borate, [tris(pentafluorophenyl), phenyl]borate, and tridecahydride-7,8-dicarbaundecaborate, with the tetrakis (pentafluorophenyl)borate being preferred.

The metallocene complexes represented by the general formulae (III) and (IV) and the half metallocene cation complex represented by the general formula (V) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same as or different from each other.

The metallocene complexes represented by the general formulae (III) to (IV), and the half metallocene cation complex represented by the general formula (V) may be each present as a monomer or as a dimer or a multimer having two or more monomers.

The metallocene complex represented by the general formula (III) can be obtained by, for example, by subjecting a lanthanoid trishalide, a scandium trishalide, or a yttrium trishalide to reaction in a solvent with a salt of indenyl (for example, a potassium salt or a lithium salt) and a salt of bis(trialkylsilyl)amide (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the complex represented by the general formula (III) is described.

[Formula 7]

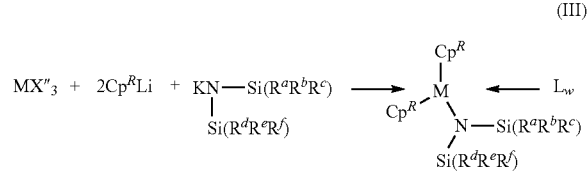

(III)

(In the Formula, X" represents a halide.)

The metallocene complex represented by the general formula (IV) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the complex represented by the general formula (IV) is described.

[Formula 8]

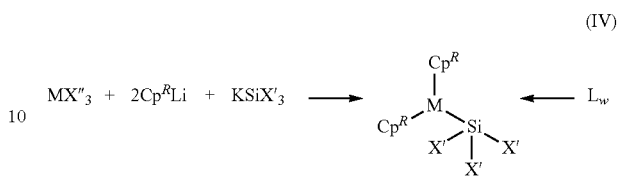

(IV)

(In the Formula, X" represents a halide.)

The half metallocene cation complex represented by the general formula (V) can be obtained by, for example, the following reaction.

[Formula 9]

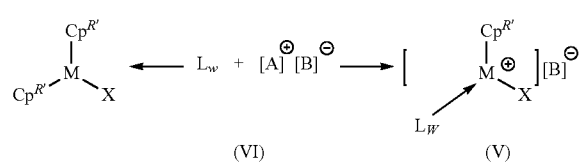

(VI)          (V)

In the general formula (VI) representing a compound: M represents a lanthanoid element, scandium, or yttrium; $Cp^{R'}$ independently represents an unsubstituted or substituted cyclopentadienyl, indenyl, or fluorenyl; X represents a hydrogen atom, a halogen atom, an alkoxy group, a thiolate group, an amide group, a silyl group, or a hydrocarbon group having 1 to 20 carbon atoms; L represents a neutral Lewis base; and w represents an integer of 0 to 3. Further, in the general formula $[A]^+[B]^-$ representing an ionic compound, $[A]^+$ represents a cation; and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl) carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri (dimethylphenyl)phosphonium cation. Of those cations, the N,N-dialkylanilinium cations or the carbonium cations are preferred, and the N,N-dialkylanilinium cations are particularly preferred.

In the general formula $[A]^+[B]^-$ representing the ionic compound to be used in the above reaction is a compound obtained by combining any one selected from the non-coordinating anions described above and any one selected from the cations described above. Preferred examples thereof include N,N-dimethylanilinium tetrakis(pentafluorophenyl) borate and triphenylcarbonium tetrakis(pentafluorophenyl) borate. The ionic compound represented by the general formula $[A]^+[B]^-$ is added in an amount of preferably 0.1-fold mol to 10-fold mol and more preferably about 1-fold mol, with respect to the metallocene complex. When the half metallocene cation complex represented by the general formula (V) is used in polymerization reaction, the half metallocene cation complex represented by the general formula (V) may be directly supplied to the polymerization system, or alternatively, the compound represented by the general formula (VI) and the ionic compound represented by the general formula $[A]^+[B]^-$ may be separately supplied to the polymerization system, to thereby form the half metallocene cation complex represented by the general formula (V) in the reaction system. In addition, the half metallocene cation complex represented by the general formula (V) may be formed in the reaction system by using the metallocene complex represented by the general formula (III) or (IV) and the ionic compound represented by the general formula $[A]^+[B]^-$ in combination.

Structures of the metallocene complex represented by the general formula (III) or (IV) and of the half metallocene cation complex represented by the general formula (V) is preferably determined by X-ray crystallography.

The co-catalyst that can be contained in the second polymerization catalyst composition may be arbitrarily selected from components used as the co-catalyst for the general polymerization catalyst composition containing a metallocene complex. Preferred examples of the co-catalyst include aluminoxanes, organic aluminum compounds, and the above ionic compounds. These co-catalysts may be contained alone or in combination of two or more.

The aluminoxane is preferably an alkyl aluminoxane. Examples of the alkyl aluminoxane include methyl aluminoxane (MAO) and modified methyl aluminoxanes. In addition, preferred examples of the modified methyl aluminoxane include MMAO-3A (manufactured by Tosoh Finechem Corporation). A content of the aluminoxane in the second polymerization catalyst composition is preferably about 10 to 1,000, more preferably about 100, at an element ratio (Al/M) of the aluminum element Al of the aluminoxane to the central metal element M in the metallocene complex.

On the other hand, a preferred example of the organic aluminum compounds may include an organic aluminum compound represented by a general formula AlRR'R" (where R and R' each independently represent a hydrocarbon group of $C_1$ to $C_{10}$ or a hydrogen atom, and R" is a hydrocarbon group of $C_1$ to $C_{10}$). Specific examples of the organic aluminum compound include a trialkyl aluminum, a dialkyl aluminum chloride, an alkyl aluminum dichloride, and a dialkyl aluminum hydride, with the trialkyl aluminum being preferred. Further, examples of the trialkyl aluminum include triethyl aluminum and triisobutyl aluminum. A content of the organic aluminum compound in the first polymerization catalyst composition is preferably 1-fold mol to 50-fold mol and more preferably about 10-fold mol, with respect to the metallocene complex.

In the first polymerization catalyst composition, the metallocene complex represented by the general formulae (III) and (IV) and the half metallocene complex represented by the general formula (V) may be combined with an appropriate co-catalyst, to thereby increase the cis-1,4 bond content and the molecular weight of a copolymer to be obtained.

A preferred example of the aforementioned polymerization catalyst composition may include:

a polymerization catalyst composition (hereinafter, also referred to as third polymerization catalyst composition) containing:

component (A): a rare earth element compound or a reactant of a rare earth element compound and a Lewis base, with no bond formed between the rare earth element and carbon;

component (B): at least one selected from a group consisting of: an ionic compound (B-1) composed of a non-coordinating anion and a cation; an aluminoxane (B-2); and at least one kind of halogen compound (B-3) from among a Lewis acid, a complex compound of a metal halide and a Lewis base, and an organic compound containing active halogen. Further, if the polymerization catalyst composition contains at least one kind of the ionic compound (B-1) and the halogen compound (B-3), the polymerization catalyst composition further contains:

component (C): an organic metal compound represented by the following general formula (I):

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table). The ionic compound (B-1) and the halogen compound (B-3) do not have carbon atoms to be fed to the component (A), and thus the component (C) becomes necessary as a source of feeding carbon to the component (A). Here, the polymerization catalyst composition still may include the component (C) even if the polymerization catalyst composition includes the aluminoxane (B-2). Further, the second polymerization catalyst composition may further include another component such as a co-catalyst, which is contained in a general rare earth element compound-based polymerization catalyst composition. In the polymerization system, the concentration of the component (A) contained in the second polymerization catalyst composition is preferably defined to fall within a range of 0.1 mol/L to 0.0001 mol/L.

The component (A) contained in the third polymerization catalyst composition is a rare earth element compound or a reactant of the rare earth element compound and a Lewis base. Here, a rare earth element compound or a reactant of the rare earth element compound and a Lewis base do not have a bond formed between the rare earth element and carbon. When the rare earth element compound or a reactant thereof does not have a bond formed between a rare earth element and carbon, the resulting compound is stable and easy to handle. Here, the rare earth element compound refers to a compound containing a lanthanoid element, scandium, or yttrium. The lanthanoid elements include elements with atomic numbers 57 to 71 of the periodic table.

Specific examples of the lanthanoid element include lanthanum, cerium, praseodymium, neodymium, promethium, samarium, europium, gadolinium, terbium, dysprosium, holmium, erbio, tulio, itterbio, and lutezio. These components (A) may be contained alone or in combination of two or more.

The rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (XI) or (XII):

$$M^{11}X^{11}{}_2 \cdot L^{11}{}_w \qquad (XI)$$

$$M^{11}X^{11}{}_3 \cdot L^{11}{}_w \qquad (XII)$$

(where: $M^{11}$ represents a lanthanoid element, scandium, or yttrium; $X^{11}$ each independently represent a hydrogen atom, a halogen atom, an alkoxy group, a thiolate group, an amide group, a silyl group, an aldehyde residue, a ketone residue, a carboxylic acid residue, a thicarboxylic acid residue, or a phosphorous compound residue; $L^{11}$ represents a Lewis base; and w represents 0 to 3).

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; aromatic alkoxy groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bistrialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thicarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid (butyl)(2-ethylhexyl), a phosphoric acid(1-methylheptyl)(2-ethylhexyl), and a phosphoric acid(2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, a and phosphonic acid mono-p-nonylphenyl; residues of phosphinic acid such as a dibutylphosphinic acid, a bis(2-ethylhexyl)phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl)phosphinic acid, (2-ethylhexyl)(2-methylhexyl)(1-methylheptyl)phosphinic acid, an (2-ethylhexyl)(p-nonylphenyl)phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more. Of those, amide groups, which easily form active species through reaction with co-catalyst, are preferred.

As to the component (A) used in the third polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in Formulae (XI) and (XII)), the Lewis base $L^{11}$ in each Formula may be the same as or different from each other.

The component (B) contained in the third polymerization catalyst composition is at least one compound selected from a group consisting of: an ionic compound (B-1); an aluminoxane (B-2); and a halogen compound (B-3). The total content of the component (B) contained in the third polymerization catalyst composition is preferably defined to fall within a range of 0.1-fold mol to 50-fold mol, with respect to the component (A).

The ionic compound represented by (B-1) is formed of non-coordinating anion and cation, and an example thereof includes: an ionic compound that reacts with the rare earth element compound as the component (A) or with the reactant resulting from Lewis base and the rare earth element compound, so as to form a cationic transition metal compound. Here, examples of the non-coordinating anion include: tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl) borate, tetrakis(tetrafluoromethylphenyl)borate, tetra(tolyl) borate, tetra(xylyl)borate, (tripheyl, pentafluorophenyl) borate, [tris(pentafluorophenyl), phenyl]borate, and tridecahydride-7,8-dicarbaundecaborate. Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl)carbonium cation include a tri(methylphenyl)carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. These ionic compounds may be contained alone or in combination of two or more. The content of the ionic compound in the third polymerization catalyst composition is preferably 0.1-fold mol to 10-fold mol, and more preferably about 1-fold mol, with respect to the component (A).

The aluminoxane represented by (B-2) is a compound obtained by contacting an organic aluminum compound with a condensation agent, and examples thereof include: a chain type aluminoxane or a cyclic aluminoxane, both having a repeating unit represented by the general formula (—Al(R')O—) (where R' is a hydrocarbon group having 1 to 10 carbon atoms and may be partly substituted with halogen atom and/or alkoxy group, and the polymerization degree of the repeating unit is preferably at least 5, more preferably at least 10). Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained using, as a raw material, a mixture of trimethyl aluminum and tributyl aluminum can be suitably used. The content of aluminoxane in the third polymerization catalyst composition is preferably about 10 to 1,000 at an element ratio (Al/M) of the aluminum element Al of the aluminoxane to the rare earth element M forming the component (A).

The halogen compound represented by (B-3) includes at least one of: a Lewis acid; a complex compound of a metal halide and a Lewis base; and an organic compound containing active halogen, and is capable of reacting with, for example, the rare earth element compound as the component (A) or with the reactant resulting from Lewis base and the rare earth element compound, so as to form a haloganated transition metal compound or a compound with a charge-deficient transition metal center. The content of the halogen compound in the third polymerization catalyst composition is preferably 1-fold mol to 5-fold mol, with respect to the component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride, with the diethyl aluminum chloride, the ethyl aluminum sesquichloride, the ethyl aluminum dichloride, the diethyl aluminum bromide, the ethyl aluminum sesquibromide, and the ethyl aluminum dibromide being particularly preferred.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper bromide; a copper iodide; a silver chloride; a silver bromide; a silver iodide; a gold chloride; a gold iodide; and a gold bromide, with the magnesium chloride, the calcium chloride, the barium chloride, the manganese chloride, the zinc chloride, and the copper chloride being preferred, and the magnesium chloride, the manganese chloride, the zinc chloride, and the copper chloride being particularly preferred.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol, with the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol being preferred.

The Lewis base is subjected to reaction with the metal halide in the proportion of 0.01 mol to 30 mol, preferably 0.5 mol to 10 mol, per 1 mol of the metal halide. The use of the reactant obtained from the reaction of the Lewis base can reduce residual metal in the polymer.

An example of the organic compound containing active halogen includes benzyl chloride.

The component (C) contained in the third polymerization catalyst composition is an organic compound represented by the general formula (I):

$$YR^1_a R^2_b R^3_c \quad (i)$$

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table), and is preferably an organic aluminum compound represented by the general formula (X):

$$AlR^{11}R^{12}R^{13} \quad (X)$$

(where $R^{11}$ and $R^{12}$ are the same or different hydrocarbon groups each having 1 to 10 carbon atoms or a hydrogen atom; and $R^{13}$ is a hydrocarbon group having 1 to 10 carbon atoms, in which $R^{13}$ may be the same as or different from $R^{11}$ or $R^{12}$ above). Examples of the organic aluminum compound in the formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The organic metal compounds as the component (C) may be contained alone or in combination of two or more. The content of the organic aluminum compound in the second polymerization catalyst composition is preferably 1-fold mol to 50-fold mol, and more preferably about 10-fold mol, with respect to the component (A).

(Rubber Composition)

The rubber composition of the present invention is not particularly limited as long as the copolymer of the present invention is contained, and may be selected as appropriate depending on the application thereof. The rubber composition preferably contains rubber components other than the copolymer of the present invention, such as an inorganic filler, a carbon black, and a crosslinking agent.

<Copolymer>

The content of the copolymer of the present invention in the rubber components is not particularly limited, and may be selected as appropriate depending on the application thereof. The preferred content of the copolymer is at least 3 mass %.

The content of the copolymer of the present invention in the rubber components falling short of 3 mass % may diminish the effect of the present invention or develop no effect at all.

<Rubber Components>

The rubber components are not particularly limited and may be selected as appropriate depending on the application thereof. Examples thereof include: the copolymer of the present invention, natural rubber, various types of butadiene rubber, various types of styrene-butadiene copolymer rubber, isoprene rubber, butyl rubber, a bromide of a copolymer of isobutylene and p-methylstyrene, halogenated butyl rubber, acrylonitrile-butadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene rubber, acrylic rubber, epichlorohydrin rubber, polysulfide rubber, silicone rubber, fluororubber, and urethane rubber. These rubber components may be used alone or in combination of two or more.

The rubber composition may be mixed with a reinforcing filler as necessary. Examples of the reinforcing filler include a carbon black and an inorganic filler, and preferably at least one selected from the carbon black and the inorganic filler.

<Inorganic Filler>

The inorganic filler is not particularly limited and may be selected as appropriate depending on the application thereof. Examples thereof include silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate. These rubber components may be used alone or in combination of two or more. In using an inorganic filler, a silane coupling agent may also be used as appropriate.

The content of the reinforcing filler is not particularly limited and may be selected as appropriate depending on the application thereof. The preferred content thereof is 5 parts by mass to 200 parts by mass with respect to 100 parts by mass of the rubber component.

The reinforcing filler added by less than 5 parts by mass in content may show little effect of the addition thereof, whereas the content exceeding 200 parts by mass tends to hinder the reinforcing filler to be mixed into the rubber component, which may impairs the performance of the rubber composition.

<Crosslinking Agent>

The crosslinking agent is not particularly limited and may be selected as appropriate depending on the application thereof. Examples thereof include a sulfur-containing crosslinking agent, an organic peroxide-containing crosslinking agent, an inorganic crosslinking agent, a polyamine crosslinking agent, a resin crosslinking agent, a sulfur compound-based crosslinking agent, an oxime-nitrosamine-based crosslinking agent, and sulfur, with the sulfur-containing crosslinking agent being more preferred as the rubber composition for a tire.

The content of the crosslinking agent is not particularly limited and may be selected as appropriate depending on the application thereof. The preferred content thereof is 0.1 parts by mass to 20 parts by mass with respect to 100 parts by mass of the rubber component.

The crosslinking agent added by less than 0.1 parts by mass in content may hardly develop crosslinking, whereas the content exceeding 20 parts by mass tends to develop crosslinking by part of the crosslinking agent during the mixing, or to impair the physical property of the vulcanizate.

<Other Components>

Other than the above, a vulcanization accelerator may also be contained. Examples of compounds that can be used as the vulcanization accelerator include: guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.

Further, if necessary, any known agent such as a reinforcing agent, a softening agent, a co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agent may be used according to the purpose of use thereof.

(Crosslinked Rubber Composition)

The crosslinked rubber composition according to the present invention is not particularly limited as long as being obtained by crosslinking the rubber composition of the present invention, and may be selected as appropriate depending on the application thereof.

The conditions of the crosslinking are not particularly limited and may be selected as appropriate depending on the application thereof. The preferred conditions of temperature and heating time for the crosslinking may preferably be in a range of 120° C. to 200° C. for 1 minute to 900 minutes.

(Tire)

A tire of the present invention is not particularly limited as long as being manufactured by using the rubber composition of the present invention or the crosslinked rubber composition of the present invention, and may be selected as appropriate depending on the application thereof.

The rubber composition of the present invention or the crosslinked rubber composition of the present invention may be applied, for example, to a tread, a base tread, a sidewall, a side reinforcing rubber, and a bead filler of a tire, without being limited thereto.

The tire can be manufactured by a conventional method. For example, a carcass layer, a belt layer, a tread layer, which are composed of unvulcanized rubber, and other members used for the production of usual tires are successively laminated on a tire molding drum, then the drum is withdrawn to obtain a green tire. Thereafter, the green tire is heated and vulcanized in accordance with an ordinary method, to thereby obtain a desired tire.

(Applications Other than Tires)

The rubber composition of the present invention or the crosslinked rubber composition of the present invention may be used for other applications than tires, such as anti-vibration rubber, seismic isolation rubber, a belt (conveyor belt), a rubber crawler, various types of hoses, and moran.

EXAMPLES

In the following, the invention of the present invention is described with reference to Examples. However, the present invention is no way limited to the following Examples.

Synthesis of $(2\text{-PhC}_9\text{H}_6)_2\text{Nd}(\mu\text{-Me})_2\text{AlMe}_2$ Under a nitrogen atmosphere, 4.5 mL of a toluene solution containing $\text{AlMe}_3$ (9.0 mmol) (manufactured by Aldrich) was slowly delivered by drops into 50 mL of a toluene solution containing 2.00 g (3.03 mmol) of $(2\text{-PhC}_9\text{H}_6)_2\text{Nd}[\text{N}(\text{SiHMe}_2)_2]$, which was stirred at room temperature for 16 hours. Thereafter, the toluene was vacuum distilled and the residue was washed for several times by hexane, to thereby obtain $(2\text{-PhC}_9\text{H}_6)_2\text{Nd}(\mu\text{-Me})_2\text{AlMe}_2$ (1.60 g, 86%) in the form of a green powder. The structure of the metallocene-based composite catalyst thus obtained was studied by $^1$H-NMR. Here, the measurement by $^1$H-NMR was performed at 20° C. using a toluene-$d_8$ as a solution.

Example 1

Figure 2:
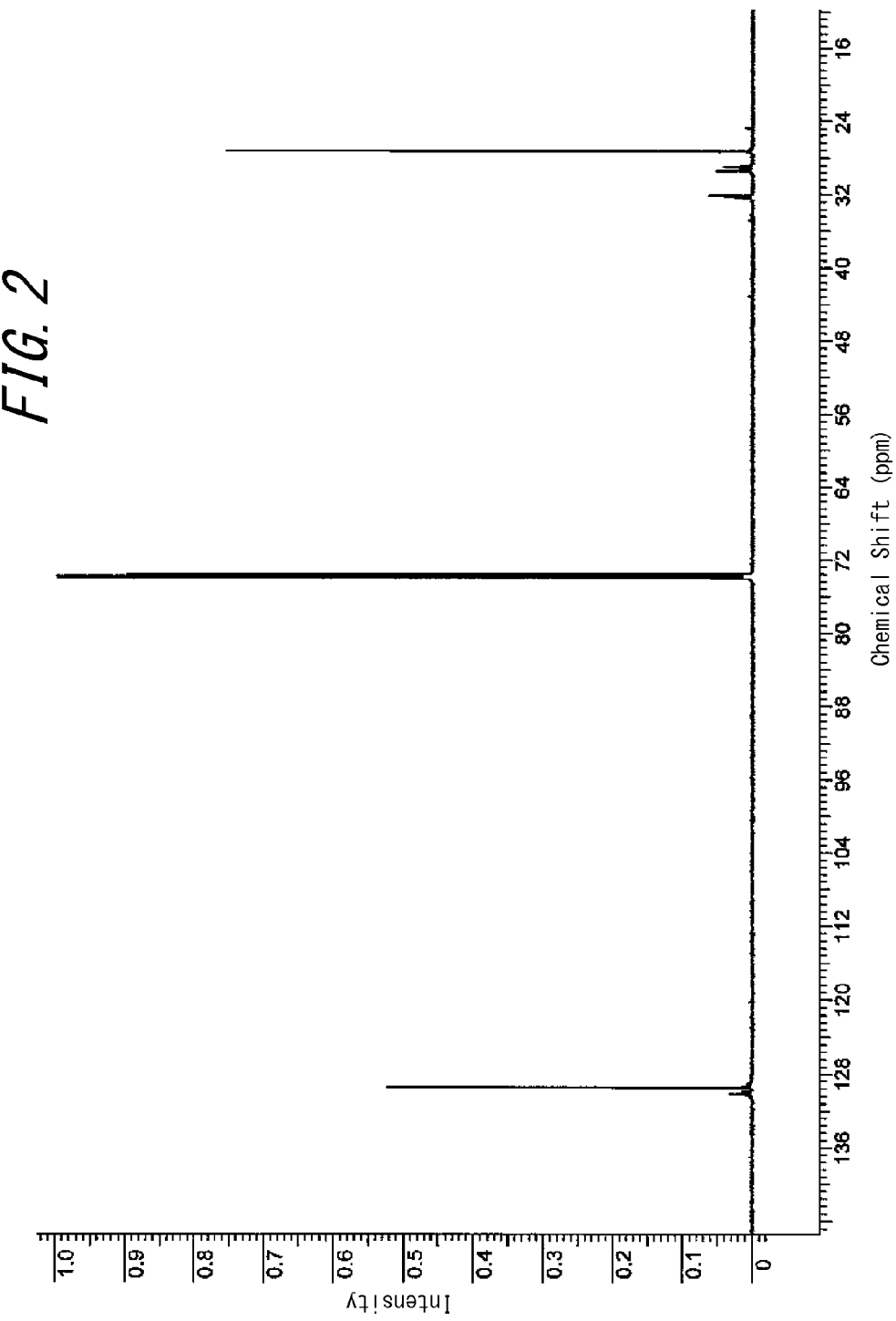
FIG. 2 is a $^{13}$C-NMR spectrum chart of the copolymer A.
Figure 3:
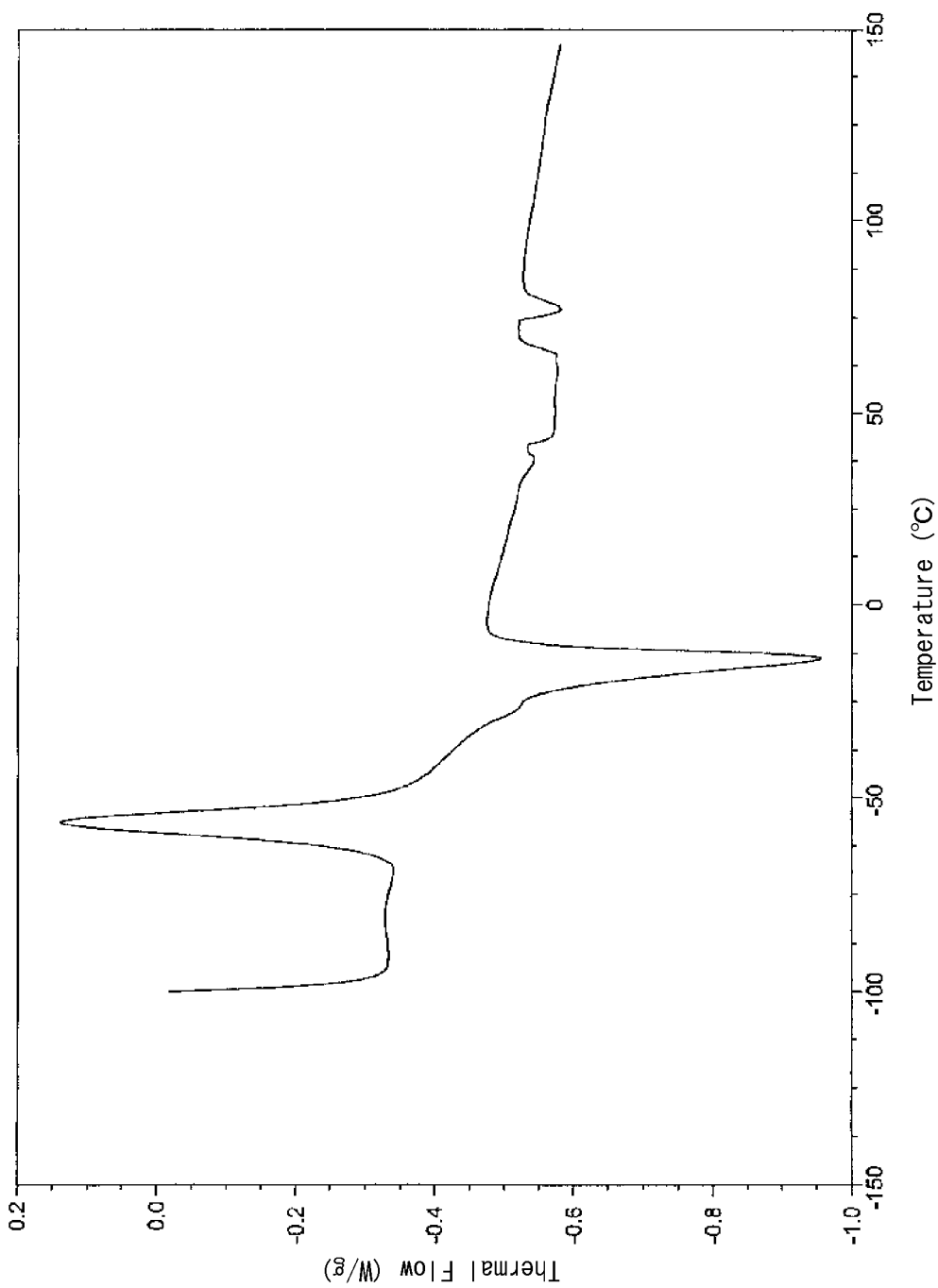
FIG. 3 shows a DSC curve of the copolymer A.

A toluene solution of 320 mL containing 3.95 g (0.073 mol) of 1,3-butadiene was added to a 400 mL pressure-resistant grass reactor that had been sufficiently dried, and then ethylene was introduced thereto at 0.6 MPa. Meanwhile, in a glovebox under a nitrogen atmosphere, 204.0 μmol of dimethylaluminum(μ-dimethyl)bis(2-phenylindenyl)neodymium $[(2\text{-PhC}_9\text{H}_6)_2\text{Nd}(\mu\text{-Me})_2\text{AlMe}_2]$ and 195.0 μmol of triphenylcarbonium tetrakis(pentafluorophenyl)borate $[\text{Ph}_3\text{CB}(\text{C}_6\text{F}_5)_4]$ were provided in a glass container, and dissolved into 20 mL of toluene, to thereby obtain a catalyst solution. After that, the catalyst solution was taken out from the glovebox, and added to the monomer solution, which was then subjected to polymerization at room temperature for 90 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer A. The yield of the copolymer B thus obtained was 3.60 g. Here, FIG. 1 is a $^1$H-NMR spectrum chart of the copolymer A, FIG. 2 is $^{13}$C-NMR spectrum chart of the copolymer B, and FIG. 3 shows a DSC curve of the copolymer A.

Example 2

Figure 4:
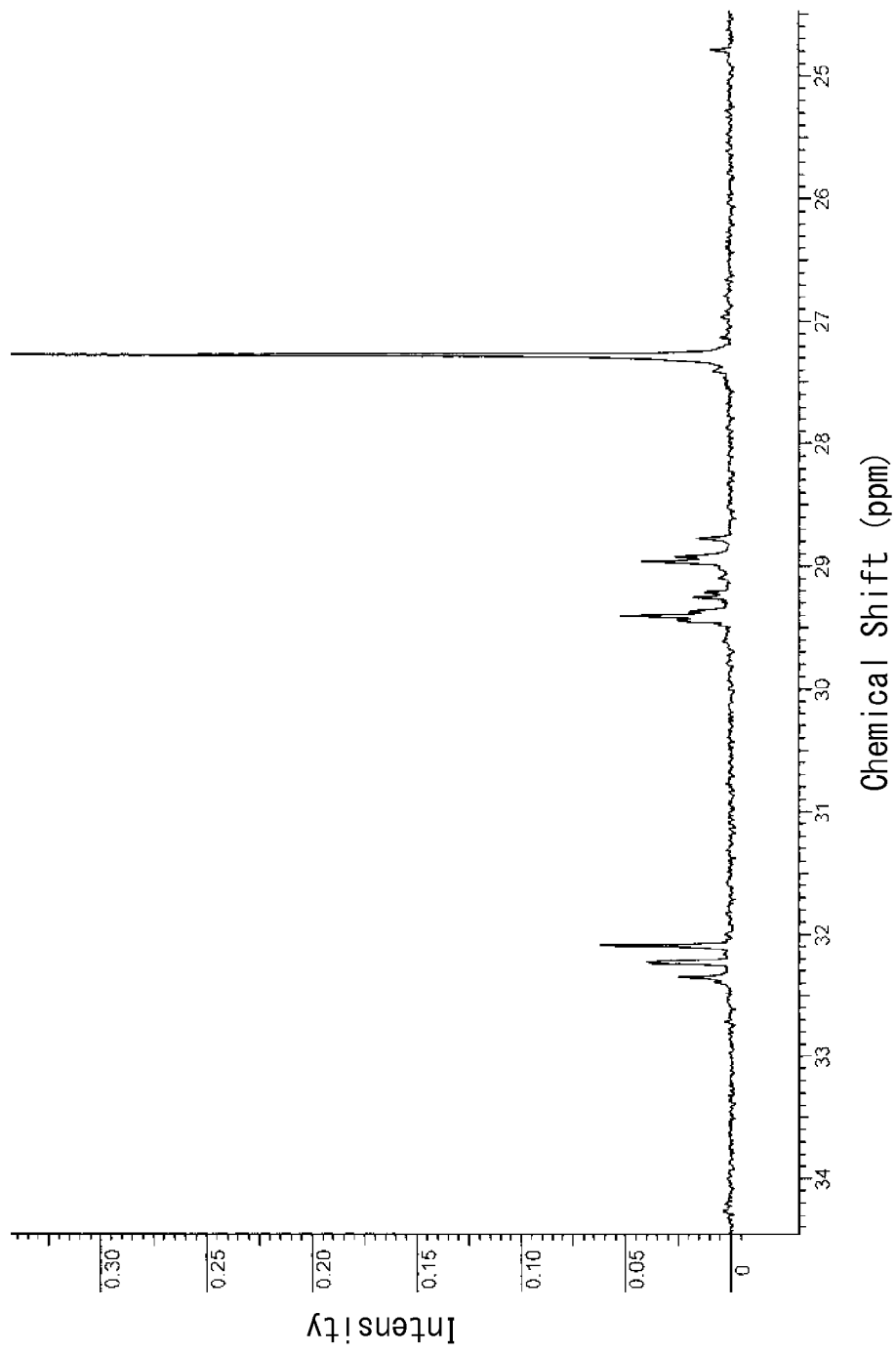
FIG. 4 is a $^{13}$C-NMR spectrum chart of a copolymer B.
Figure 5:
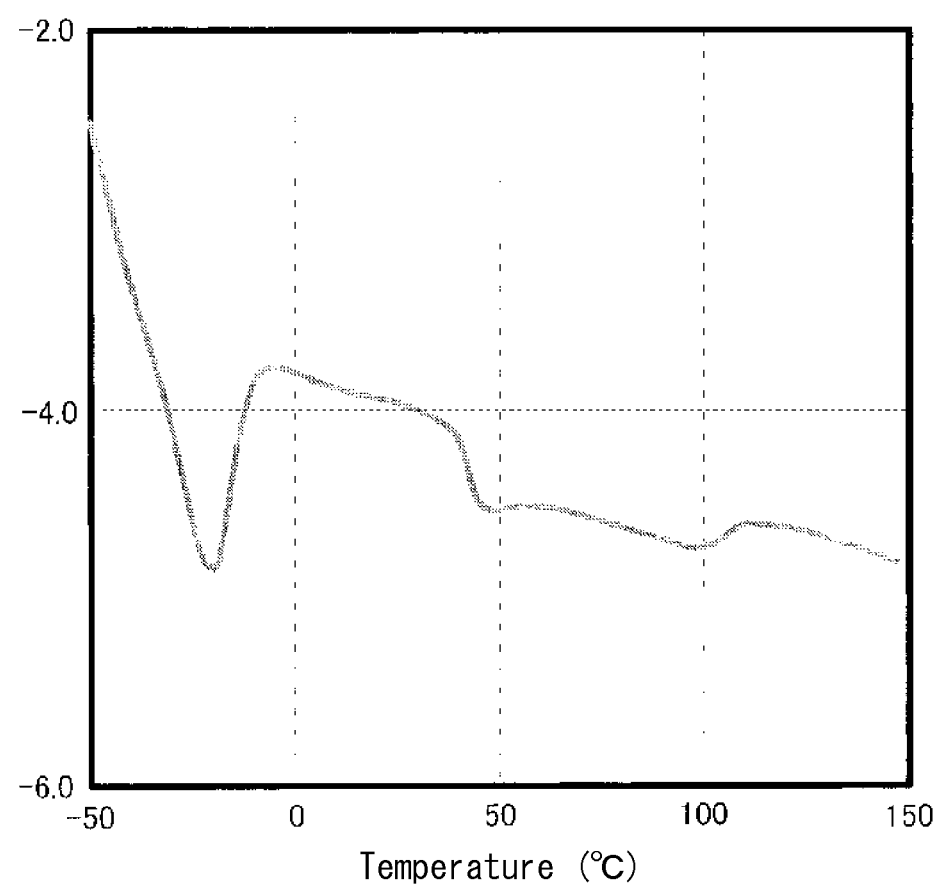
FIG. 5 shows a DSC curve of the copolymer B.

A toluene solution of 160 mL was added to a 400 mL pressure-resistant grass reactor that had been sufficiently dried, and then ethylene was introduced thereto at 0.8 MPa. Meanwhile, in a glovebox under a nitrogen atmosphere, 28.5 μmol of bis(2-phenylindenyl)gadolinium bis(dimethylsilylamide) $[(2\text{-PhC}_9\text{H}_6)_2\text{GdN}(\text{SiHMe}_2)_2]$, 34.2 μmol of dimethylanilinium tetrakis(pentafluorophenyl)borate $[\text{Me}_2\text{NHPhB}(\text{C}_6\text{F}_5)_4]$, and 1.43 mmol of diisobutylaluminum hydride were provided in a glass container, which was dissolved into 8 mL of toluene, to thereby obtain a catalyst solution. Next, the catalyst solution was taken out from the glovebox and added by 28.2 μmol of gadolinium equivalent to the monomer solution while adding a toluene solution containing 1,3-butadiene at a rate of 0.3 g/min in terms of 1,3-butadiene, which was then subjected to polymerization for another 30 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer B. The yield of the copolymer B thus obtained was 15.50 g. Here, FIG. 4 is a $^{13}$C-NMR spectrum chart of the copolymer B, and FIG. 5 shows a DSC curve of the copolymer B.

Example 3

A toluene solution of 700 mL containing 28.0 g (0.52 mol) of 1,3-butadiene was added to a 2 L stainless reactor that had been sufficiently dried, and then ethylene was introduced thereto at 0.8 MPa. Meanwhile, in a glovebox under a nitrogen atmosphere, 400.0 μmol of dimethylaluminum(μ-dimethyl)bis(2-phenylindenyl)neodymium $[(2\text{-PhC}_9\text{H}_6)_2\text{Nd}(\mu\text{-Me})_2\text{AlMe}_2]$ and 200.0 μmol of triphenylcarbonium tetrakis(pentafluorophenyl)borate $[\text{Ph}_3\text{CB}(\text{C}_6\text{F}_5)_4]$ were provided in a glass container, and dissolved into 80 mL of toluene, to thereby obtain a catalyst solution. After that, the catalyst solution was taken out from the glovebox, and the catalyst solution was added by 390.0 μmol of neodymium equivalent to the monomer solution, which was then subjected to polymerization at room temperature for 120 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer C. The yield of the copolymer C thus obtained was 18.00 g.

Example 4

A toluene solution of 120 mL containing 2.83 g (0.052 mol) of 1,3-butadiene was added to a 400 mL pressure-resistant glass reactor that had been sufficiently dried, and then ethylene was introduced thereto at 0.8 MPa. Meanwhile, in a glovebox under a nitrogen atmosphere, 27.0 μmol of bis(2-methylindenyl)praseodymium bis(dimethylsilylamide) [(2-MeC$_9$H$_6$)$_2$Pr{N(SiHMe$_2$)$_2$}, 27.0 μmol of triphenylcarbonium tetrakis(pentafluorophenyl)borate (Ph$_3$CB(C$_6$F$_5$)$_4$), and 1.35 mmol of triisobutylaluminum were provided in a glass container, which was dissolved into 5 mL of toluene, to thereby obtain a catalyst solution. After that, the catalyst solution was taken out from the glovebox and added to the monomer solution, and subjected to polymerization at 50° C. for 60 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer D. The yield of the copolymer D thus obtained was 1.50 g.

Comparative Example 1

Butadiene rubber (BR01, manufactured by JSR) was prepared as a sample of Comparative Example.

The copolymers A to D of Examples 1 to 4, the butadiene rubber of Comparative Example 1, and the copolymer E of Comparative Example 2 were each subjected to measurement and evaluation by the following method so as to investigate the microstructure, the ethylene content, the weight-average molecular weight (Mw), the molecular weight distribution (Mw/Mn), and the DSC curve. Here, the ordinate of the DSC curve is the thermal flow.

(1) Microstructure (1,2-Vinyl Bond Content, Cis-1,4 Bond Content)

The microstructure (1,2-vinyl bond content) of the butadiene unit in the copolymer is determined from an integral ratio of 1,2-vinyl bond component (5.0 ppm to 5.1 ppm) to a butadiene bond component (5 ppm to 5.6 ppm) of the whole, based on $^1$H-NMR spectrum (100° C., d-tetrachloroethane standard: 6 ppm), and the microstructure (cis-1,4 bond content) of the butadiene unit in the copolymer is determined from an integral ratio of cis-1,4 bond component (26.5 ppm to 27.5 ppm) to a butadiene bond component (26.5 ppm to 27.5 ppm+31.5 ppm to 32.5 ppm) of the whole, based on $^{13}$C-NMR spectrum (100° C., d-tetrachloroethane standard: 73.8 ppm). The calculated values of the 1,2-vinyl bond content (%) and cis-1,4 bond content (%) are shown in Table 1.

(2) Ethylene Content

The content of the ethylene unit in the copolymer is determined from an integral ratio of an ethylene bond component (28.5 ppm to 30.0 ppm) of the whole to a butadiene bond component (26.5 ppm to 27.5 ppm+31.5 ppm to 32.5 ppm) of the whole, based on $^{13}$C-NMR spectrum (100° C., d-tetrachloroethane standard: 7.38 ppm). The content (mol %) of the ethylene unit is shown in Table 1.

(3) Weight-Average Molecular Weight (Mw) and Molecular Weight Distribution (Mw/Mn)

A polystyrene equivalent weight-average molecular weight (MW) and a molecular weight distribution (Mw/Mn) of each copolymer were obtained through gel permeation chromatography [GPC: HLC-8121GPC/HT (manufactured by Tosoh Corporation), column: two of GMH$_{HR}$-H(S)HT (manufactured by Tosoh Corporation), detector: a differential refractometer (RI)], using monodisperse polystyrene as a reference. The measurement temperature was 140° C.

(4) DSC Curve

A DSC curve of each copolymer was obtained by differential scanning calorimetry (DSC) according to JIS K7121-1987, and a block polyethylene melting point (DSC peak temperature) was measured. In the measurement, used as samples were rubber components obtained by immersing each copolymer in a large amount of tetrahydrofuran for 48 hours so as to remove all the components dissolved in the tetrahydrofuran and then by drying the copolymer, in order to circumvent the effect to be produced by impurities such as single polymers and catalyst residues.

TABLE 1

|  | Example 1 | Example 2 | Example 3 | Example 4 | Comparative Example 1 |
|---|---|---|---|---|---|
| Copolymer | A | B | C | D | butadiene rubber |
| Mw (×10$^3$) | 40 | 100 | 263 | 201 | 454 |
| Mw/Mn | 1.90 | 2.90 | 1.58 | 1.90 | 3.45 |
| Vinyl Bond Content (%) | 1.6 | 1.3 | 2.1 | 2.6 | 1.8 |
| Cis-1,4 Bond Content (%) | 78 | 94 | 91 | 50 | 97 |
| Ethylene Content (mol %) | 24 | 20 | 15 | 11 | 0 |

Further, the sequence distribution of the copolymer A was analyzed by applying ozonolysis-GPC measurements disclosed in a document ("Polymer preprints, Japan, Vol. 42, No. 4, pp. 1347). A polystyrene equivalent weight-average molecular weight (MW) and molecular weight distribution (Mw/Mn) of each copolymer were obtained through gel permeation chromatography [GPC: (manufactured by Tosoh Corporation), column: two of GPC HT-803 (manufactured by Showa Denko K.K.), detector: differential refractometer (RI), using monodisperse polystyrene as a reference, at measurement temperature of 140° C.]. The result showed that the total ethylene component contains 10 mass % or less of a block ethylene component, that is, polyethylene component having a number-average molecular weight (Mn) of 1,000 or more, that is, the component A was high in randomness.

The NMR spectrum was analyzed based on documents such as "Makromol. Chem. 192, 2591-2601 (1991)", "Macromolecules. 34, 6304-6311 (2001)", and "J. Am. Chem. Soc. Macromolecules. 127, 5774-5775 (2005)".

The $^1$H-NMR spectrum chart of the copolymer A of FIG. 1 shows peaks derived from ethylene in a range of 1.3 ppm to 1.6 ppm. Further, the $^{13}$C-NMR spectrum chart of the copolymer A of FIG. 2 shows peaks derived from ethylene in a range of 27.5 ppm to 33 ppm. When observed in further detail, there were observed many peaks other than a peak at 29.4 ppm indicating at least four-chained ethylene, which means that ethylene units having three or less chains are randomly arranged in butadiene. It was also confirmed that the copolymer A hardly includes the cyclic structure described in the documents.

Further, in the DSC curve of the copolymer A of FIG. 3, a crystallization temperature of around 120° C. to be derived from the block sequence including monomer units of ethylene could not be observed.

The aforementioned measurement reveals that the copolymer A is formed of 1,4 bonds and 1,2 bonds (including 3,4 bonds) without hardly including cyclic structure, and does not include a block sequence including monomer units of ethylene, and thus the copolymer is a random copolymer having randomly arranged monomer units of 1,3-butadiene and of ethylene.

The $^{13}$C-NMR spectrum chart of the copolymer B of FIG. 4 similarly shows peaks derived from ethylene in a range of 27.5 ppm to 33 ppm. When observed in further detail, there were observed many peaks other than a peak at 29.4 ppm indicating at least four-chained ethylene. In the DSC curve of the copolymer B of FIG. 5, a crystallization temperature of around 120° C. to be derived from the block sequence including monomer units of ethylene could not be observed.

The aforementioned measurement reveals that the copolymers B is also a random copolymer having randomly arranged monomer units of 1,3-butadiene and of ethylene.

Further, it was similarly confirmed that the copolymers C and D were random copolymers having randomly arranged monomer units of 1,3-butadiene and of ethylene.

As Examples 3, 4 and Comparative Example 1, the rubber compositions formulated as shown in Table 2 were prepared, which were vulcanized at 160° C. for 20 minutes. The vulcanized rubber compositions thus obtained were subjected to measurements of heat resistance and flex fatigue resistance, according to the following method.

TABLE 2

|  | parts by mass |
| --- | --- |
| copolymer | 100 |
| stearic acid | 2 |
| carbon black (FEF class) | 50 |
| age resistor *1 | 1 |
| zinc oxide | 3 |
| co-agent CZ-G *2 | 0.4 |
| co-agent DM-P *3 | 0.2 |
| sulfur | 1.4 |

*1: N-(1,3-dimethylbutyl)-N'-p-phenylenediamine (NOCRAC 6C), manufactured by OUCHI SHINKO CHEMICAL INDUSTRIAL CO., LTD.
*2: N-cyclohexyl-2-benzothiazolesulfenamide (NOCCELER CZ-G), manufactured by OUCHI SHINKO CHEMICAL INDUSTRIAL CO., LTD.
*3: dibenzothiazyl disulfide (NOCCELER DM-P), manufactured by OUCHI SHINKO CHEMICAL INDUSTRIAL CO., LTD.

<<Heat Resistance Test>>

Vulcanized samples were each caused to deteriorate in an oven of 100° C. for 48 hours. Then, each sample taken out from the oven was subjected to tension test according to JIS K 6251 at room temperature, to thereby obtain the elongation at break. Table 3 shows the result thereof as the retention of elongation (%), which are indexed with a score of 100 representing the elongation at break obtained by tension test performed for samples with no thermal degradation.

The larger retention (%) shows more excellent heat resistance.

<<Crack Growth Resistance (Constant Strain) Test>>

A crack of 0.5 mm was produced in the center of JIS No. 3 test piece, and the test piece was repeatedly subjected to fatigue under a constant strain of 0% to 100% at room temperature, so as to count the number of times the sample was subjected to fatigue until the fractured. The larger index value shows more excellent crack growth resistance.

TABLE 3

|  | Example 3 | Example 4 | Comparative Example 1 |
| --- | --- | --- | --- |
| Copolymer | C | D | butadiene rubber |
| Mw ($\times 10^3$) | 293 | 243 | 454 |
| Mw/Mn | 1.58 | 1.68 | 3.45 |
| Cis-1,4 Bond Content (%) | 91 | 50 | 97 |
| Vinyl Bond Content (%) | 2.1 | 2.6 | 1.8 |
| Ethylene Content (mol %) | 15 | 11 | 0 |
| Heat Resistance (Md variation (%)) | 62 | 56 | 48 |
| Crack Growth Resistance (Constant Strain) | 142 | 116 | 100 |

INDUSTRIAL APPLICABILITY

The copolymer of the present invention can be used generally for elastomer products, in particular, tire members.

The invention claimed is:

1. A copolymer of a conjugated diene compound and a non-conjugated olefin, comprising a random copolymer including randomly arranged monomer units of the conjugated diene compound and of the non-conjugated olefin,
   wherein the conjugated diene compound unit has a cis-1,4 bond content of at least 25%,
   wherein the random structure has no crystallization temperature, which is to be derived from a block sequence including monomer units of the non-conjugated olefin,
   wherein the conjugated diene compound unit has 1,2 adducts (including 3,4 adducts) content of 5% or less,
   wherein the non-conjugated olefin is contained over 0 mol % to 50 mol % or less, and
   wherein the non-conjugated olefin is an acyclic olefin.

2. The copolymer of a conjugated diene compound and a non-conjugated olefin according to claim 1, wherein the conjugated diene compound unit has a cis-1,4 bond content of more than 50%.

3. The copolymer of a conjugated diene compound and a non-conjugated olefin according to claim 1, wherein the non-conjugated olefin is contained over 0 mol % to 20 mol % or less.

4. The copolymer of a conjugated diene compound and a non-conjugated olefin according to claim 1, comprising a copolymer having a polystyrene-equivalent average-weight molecular weight of 10,000 to 10,000,000.

5. The copolymer of a conjugated diene compound and a non-conjugated olefin according to claim 1, comprising a copolymer having a molecular weight distribution (Mw/Mn) of 10 or less.

6. The copolymer of a conjugated diene compound and a non-conjugated olefin according to claim 1, wherein the non-conjugated olefin has 2 to 10 carbon atoms.

7. The copolymer of a conjugated diene compound and a non-conjugated olefin according to claim 1, wherein the non-conjugated olefin is at least one selected from a group consisting of ethylene, propylene, and 1-butene.

8. The copolymer of a conjugated diene compound and a non-conjugated olefin according to claim 7, wherein the non-conjugated olefin is ethylene.

9. The copolymer of a conjugated diene compound and a non-conjugated olefin according to claim 1, wherein the conjugated diene compound is at least one selected from a group consisting of 1,3-butadiene and isoprene.

10. A rubber composition comprising the copolymer of a conjugated diene compound and a non-conjugated olefin according to claim 1.

11. A tire manufactured by using the rubber composition according to claim 10.

\* \* \* \* \*